SR

12/17/85 XR 4,559,526

United States Patent [19]

Tani et al.

[11] Patent Number: 4,559,526

[45] Date of Patent: Dec. 17, 1985

[54] SECURITY ALARM SYSTEM

[75] Inventors: Kozaburo Tani, Kawasaki; Tsutomu Watanabe, Fuchu, both of Japan

[73] Assignee: Secom Co., Ltd., Tokyo, Japan

[21] Appl. No.: 482,484

[22] Filed: Apr. 6, 1983

[30] Foreign Application Priority Data

Jun. 29, 1982 [JP] Japan ............................... 57-110746

[51] Int. Cl.[4] .......................... G08B 1/08; H04Q 7/00

[52] U.S. Cl. .................................... 340/539; 340/531; 340/693; 455/7; 455/53

[58] Field of Search ............... 340/539, 506, 531, 534, 340/505, 345, 693; 455/7, 9, 11, 13, 14, 15, 39, 53, 54, 73

[56] References Cited

U.S. PATENT DOCUMENTS 3,914,692 10/1975 Seaborn, Jr. ........................ 340/539
3,925,763 12/1975 Wadhwani et al. ................. 340/534
4,092,643 5/1978 Stolarczyk .......................... 340/534
4,455,551 6/1984 Lemelson ........................... 340/534

*Primary Examiner*—Donnie L. Crosland
*Attorney, Agent, or Firm*—Armstrong Nikaidio, Marmelstein & Kubovcik

[57] ABSTRACT

A security system comprising a plurality of sensors for detecting emergencies in a predetermined guard area, a transmitter-receiver for converting the emergency data into electric signals and transmitting the electric signals via a radio, a repeater for receiving the electric signals from the transmitter-receiver and transmitting the signal to a security controller, a security controller for setting a guard mode such as "start watch", and "release the watch" and transmitting the emergency and ordinary data to a central station through a transmission line such as a telephone cable or personal circuit, and a central station for supervising the predetermined guard area based on the data from this and other security controllers.

5 Claims, 8 Drawing Figures

SECURITY ALARM SYSTEM

BACKGROUND OF THE INVENTION

1. Field of the Invention

The present invention relates to a security alarm system by which emergencies, such as unauthorized intrusions, destruction or removal of property by intruders, fire, and failure of equipment, are detected in a predetermined guard area and a detected signals are transmitted from said predetermined guard area to a central station.

2. Description of the Prior Art

Conventional security alarm systems such as disclosed in Japanese Unexamined Utility Model Publication No. 57-123594, comprise a plurality of sensors for detecting emergencies in a predetermined guard area, a means for converting the emergency data of the sensors into electric signals, and a security controller for transimitting the electric signals to a central station through cable or by radio.

The use of wire necessitates complex wiring work between the sensors and security controller and is problematical in that the resultant system is more expensive and takes longer to install than with radio transmission. Also, wiring works tends to detract from the aesthetic sense of the installation area.

On the other hand, the use of radio transmission, while better than wire in these regards, is problematical in that the system is then designed based on one-way transmission of signals from the sensors. Should the sensors or other transmitters which are connected to the sensors by wire and transmits signal from the sensors be destroyed or removed by intruders or break down, the security controller would assume a normal situation exists even in the event of emergencies.

Some sort of continuous transmission of signals from the sensors to the security controller may be considered, but this would entail greatly increased power consumption.

SUMMARY OF THE INVENTION

The primary object of the present invention is to provide a security alarm system using radio transmission which can detect intruder destruction or removal of system equipment and breakdowns of system equipment, thereby ensuring high reliability monitoring of a predetermined guard area.

Another object of the present invention is to provide a security system using radio transmission, ensuring high reliability monitoring of a predetermined guard area, which can operate on reduced battery consumption.

In accordance with the present invention, there is provided a security alarm system comprising a plurality of sensors for detecting emergencies in a predetermined guard area; a transmitter-receiver for converting the emergency data into electric signals and transmitting the electric signals by radio; a repeater for receiving the electric signals from the transmitter-receiver and transmitting the signals thereon; a security controller, receiving the signals, for setting a guard mode such as "start watch" and "release watch" and transmitting the emergency data and the guard mode signal thereon using a transmission line, including a telephone cable, a leased line or radio; and a central station, receiving the data, for supervising the predetermined guard area based on the data from this and other security controllers in other premises.

DESCRIPTION OF THE PREFERRED EMBODIMENTS

The present invention is based on the concept of providing a transmitter-receiver near each sensor of the system. When a sensor detects an emergency, the transmitter-receiver transmits a signal to a security controller via a repeater by radio. On the other hand, the security controller can transmit a watch signal to the transmitter-receiver via the repeater before transmitting a guard mode signal. Thus, in this 2-way transmission system, emergencies can be detected and the equipment can be watched for destruction or removal by intruders and for breakdowns.

Battery consumption in the present invention is saved in that the circuits of the transmitter-receiver are usually fully powered only during generation of pulses from a pulse oscillator. Thus, the transmitter-receiver can be controlled to be powered by a predetermined voltage having a rated voltage for just a predetermined term in response to signals from the sensors or the watch signals before transmitting the guard mode signal from the security controller.

Figure 1:
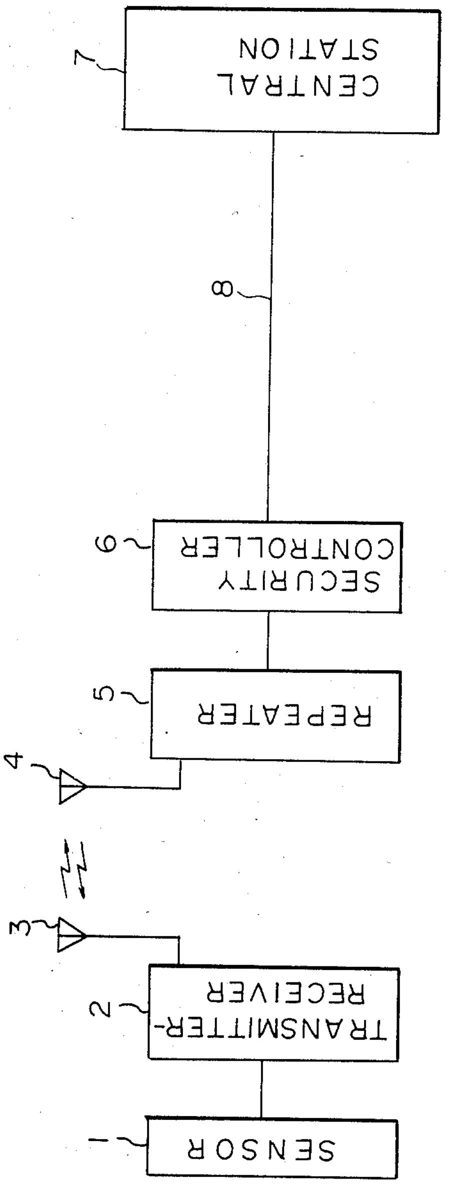
FIG. 1 is a block diagram of the fundamental structure of a security alarm system according to an embodiment of the present invention.

Referring to FIG. 1, a security alarm system of the present invention comprises a plurality of sensors 1, including fire sensors and intrusion detectors, for detecting emergencies in a predetermined guard area; a transmitter-receiver 2, provided near the sensor 1, for converting the emergency data into electric signals and transmitting the same by radio via an antenna 3; a repeater 5, for receiving the electric signals from the transmitter-receiver 2 via an antenna 4 and transmitting the same; a security controller 6, provided at the side of the repeater 5 and receiving the electric signals from the repeater 5, for setting a guard mode such as "start watch", "release watch", and "confirm present condition", and transmitting the emergency data and the guard mode signal thereon using a transmission line 8, including a telephone cable, a leased line or radio, the security controller 6 being provided inside the guard area; and a central station 7, receiving the emergency data or the guard mode signal, for supervising the predetermined guard area based on the data from this and other security controllers 6 in other premises.

Figure 2:
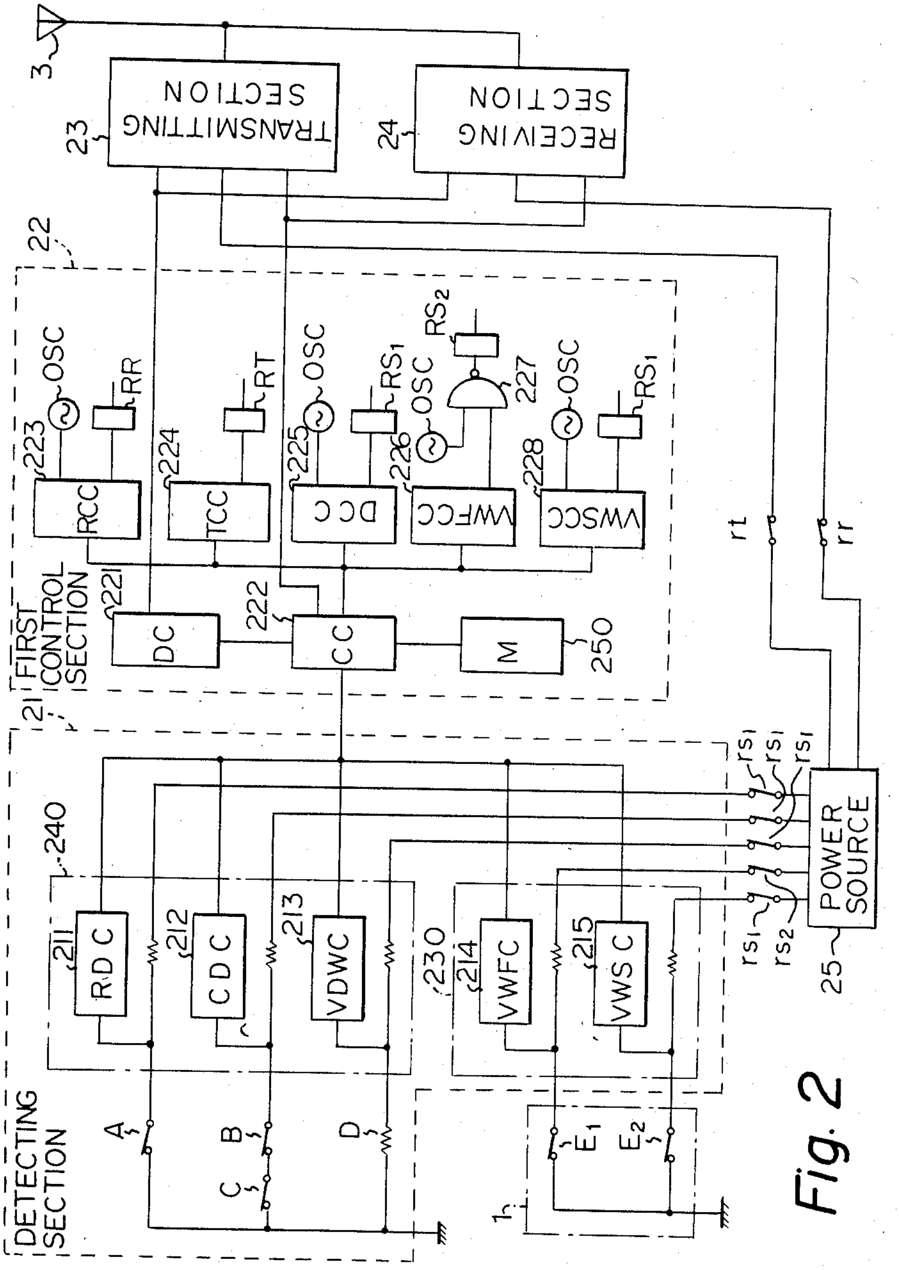
FIG. 2 illustrates the structure of a transmitter-receiver used in the system of FIG. 1.

Referring to FIG. 2, the transmitter-receiver 2 used in the security alarm system of the present invention comprises a detecting section 21 for detecting emergency data transmitted from the sensors 1 and from the detectors (A∼D) provided inside; a first control section 22 for controlling the term and rate of the voltage applied from a power source 25; a transmitting section 23 for converting emergency and ordinary data into coded electric signals and transmitting the coded electric signals to the repeater 5 via an antenna 3; a section 24 for receiving the coded watch signals before transmitting the guard mode signal, the guard mode and a confirmation signal transmitted from the repeater 5 and decoding them; a memory 250 for storing the emergency and ordinary data for a short term and a battery 25 used for the power source.

The detecting section 21 comprises a removal detector A, having a mercury switch or a lead type switch, for detecting removal of the transmitter-receiver 2 by an intruder; a destruction detector B, having a wire provided inside the transmitter-receiver 2 for detecting destruction of the transmitter-receiver 2 by an intruder; a cover detector C having a tamper switch which opens or shuts with the opening or shutting of the cover of the transmitter-receiver 2, and a voltage detector D for detecting the voltage of the power source.

The detecting section 21 also comprises a removal detecting circuit (RDC) 211 for controlling the signals transmitted from the removal detector A, a cover detecting circuit (CDC) 212 for controlling the signals transmitted from the destruction detector B and the cover detector C, a voltage down watching circuit (VDWC) 213 for watching the voltage of the power source, and a voltage watching circuit 230 including first and second circuits (VWFC, VWSC) 214, 215 for controlling the signal voltage transmitted from the sensor 1 including the contact point for intrusion detectors $E_1$ and the contact point for the fire sensors $E_2$. The first control section 22 comprises a discriminating circuit (DC) 221 for discriminating a watch signal, from other signals via the receiving section 24, a control circuit (CC) 222 for controlling the operation of the relays based on the signals transmitted from the detecting section 21, a receiving control circuit (RCC) 223 for controlling the relay RR, a transmitting control circuit (TCC) 224 for controlling the relay RT, a detecting control circuit (DCC) 225 for controlling the relay $RS_1$, a voltage watching first control circuit for controlling the relay $RS_2$ via the nand gate 227, and a voltage watching second control circuit (VWSCC) 228 for controlling the relay $RS_1$.

Figure 3:
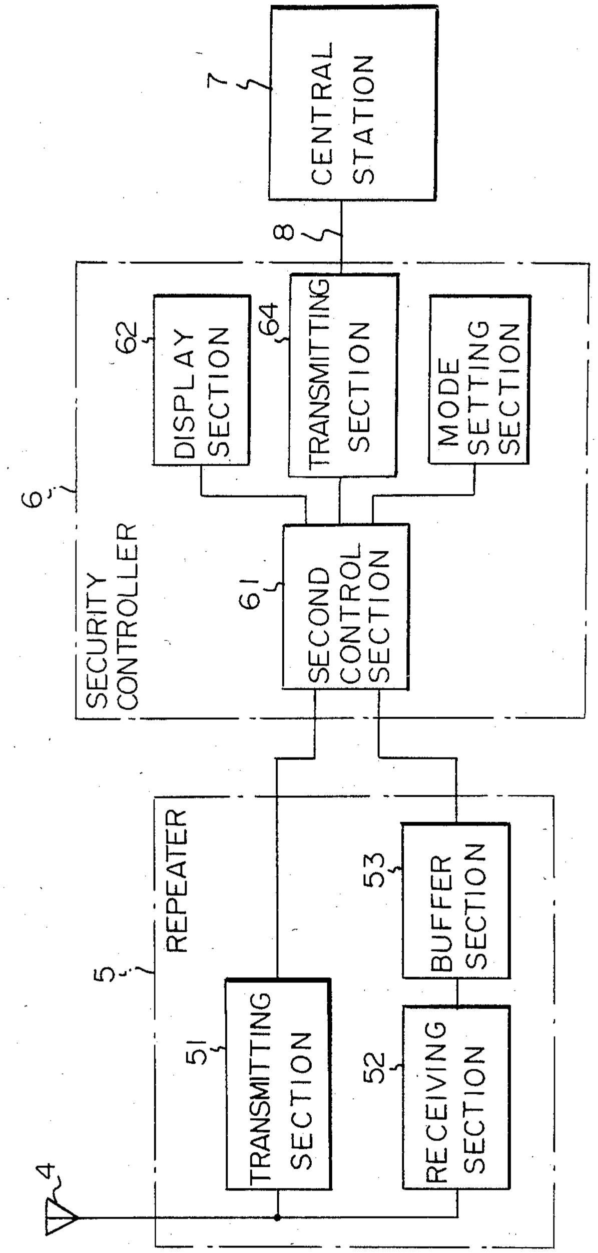
FIG. 3 illustrates the structure of a repeater and security controller used in the system of FIG. 1.

Referring to FIG. 3, the repeater 5 and the security controller 6 used in the security alarm system of the present invention are shown in more detail. The repeater 5 comprises a transmitting section 51 for radioing the coded watch signal, guard mode signal and the confirmation signal to the transmitter-receiver 2 via the antenna 4, a receiving section 52 for receiving the coded emergency or ordinary data and decoding it to the electric signal, and a buffer section 53 for storing the data for a short term.

The security controller 6 comprises a second control section 61 for transmitting the watch signal, the guard mode signal and the confirmation signal to the repeater 5, a display section 62 for displaying the different modes and the emergency data transmitted from the repeater 5 using, for example, a cathode-ray tube, liquid crystal device or sound, etc, a mode setting section 63 for setting the "start watch" mode, "release watch" mode and "confirm present condition" mode, and a transmitting section 64 for transmitting emergency data or the guard mode signal to the central station 7 using a transmission line 8.

In the embodiment of the present invention, the following parts were utilized. In the transmitter-receiver 2, the transmitting section 23 comprised a Model ECE 6004 transmission unit made by Matsushita Electric Works, Ltd., the receiving section 24 comprised a Model ECE 6005 receiver unit also made by Matsushita Electric Works, Ltd., the first control section 22 comprised a Model HD 63L05 FOA01P control unit made by Hitachi, Ltd., and the pulse oscillator OSC comprised a Model HC 43/U oscillation unit made by Kinseki Co. In the repeater 5, the transmitting section 51 and the receiving section 52 comprised the same transmission and receiver unit as the transmitter-receiver 2. In the security controller 6, the second control section 61 comprised a Model HD 6303P and HD 6301V control unit made by Hitachi, Ltd., a Model TMM 2764D -ROM which stores a program data for controlling the second control section 61- made by Toshiba Co, and, as a buffer of the second control section 61, a Model HM 61172P-4 control unit made by Hitachi, Ltd. The display section 62 comprised a Model 5L-044C unit made by Nippon Electric Co., a Model HD 44103A, a Model HD 44102B, a Model HD LR207-C unit made by Hitachi, Ltd, and, for voice synthesizing, a Model T 6721 and T 6773 unit made by Toshiba Co.

The operation of the security alarm system according to the present invention will now be explained.

Figure 4A:
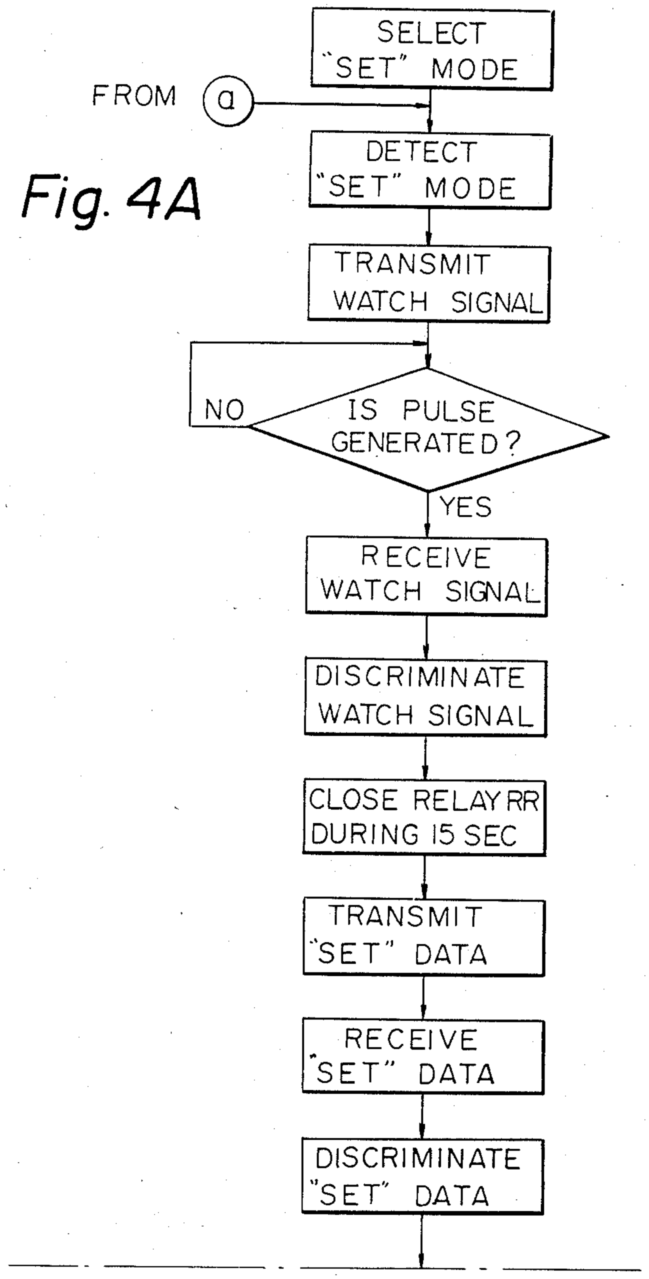
FIGS. 4A-4C are a flowchart of the "start watch" mode routine in the operation of the security alarm system of FIG. 1.
Figure 4:
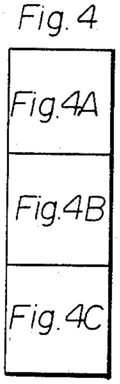
Figure 4B:
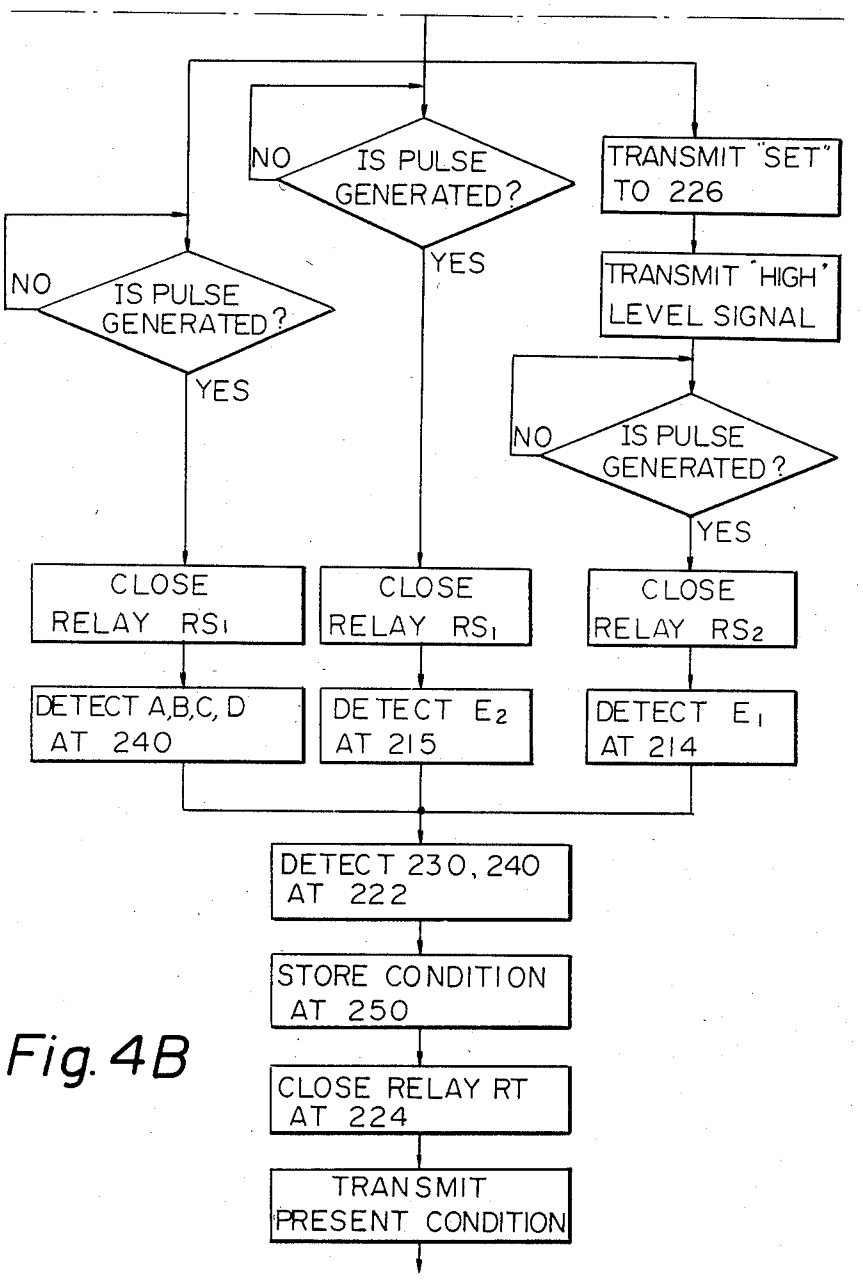
Figure 4C:
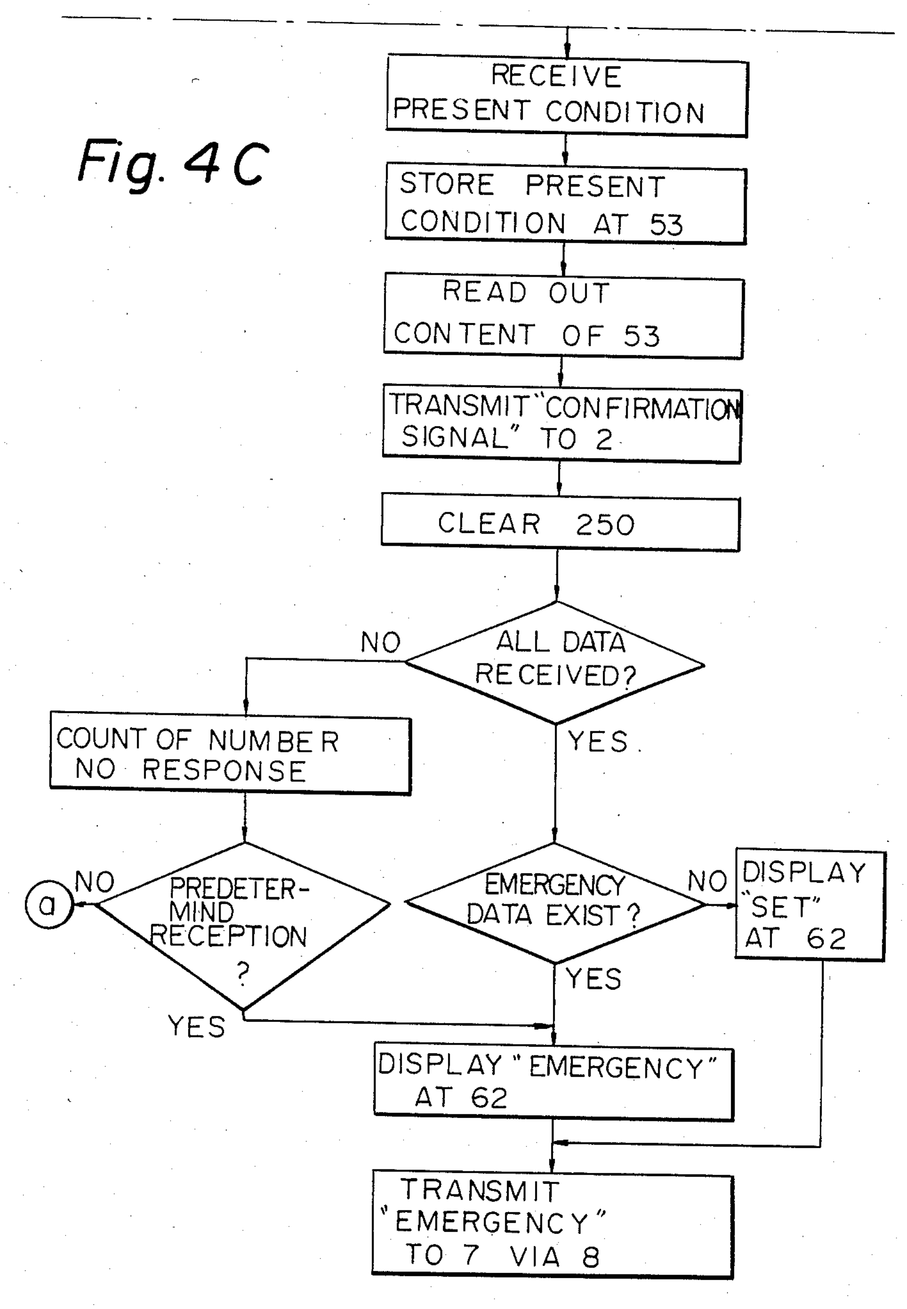

FIG. 4 is a flowchart of the "start watch" mode routine in the operation of the security alarm system. The mode setting section 63 of the security controller 6 is first selected to the "set" position indicating the "start watch" mode. The second control section 61 detects the "set" mode as the guard mode signal and transmits the watch signal, to the transmitting section 51 of the repeater 5, for several seconds before the guard mode signal is transmitted from the second control section 61 to the transmitting section 51 of the repeater 5. The transmitting section 51 converts watch signal to a coded signal and transmits the coded signal to the transmitter-receiver 2 via the antenna 4.

The receiving section 24 receives the coded signal only while the pulsating voltage (about 10 msec pulse width) from the first control section 22 is applied.

Since the pulse period of the pulsating voltage is set shorter than the term of the watch signal, the watch signal always can be received by the receiving section 24. The coded signal is decoded by the receiving section 24 and transmitted to the first control section 22.

The discriminating circuit 221 of the first control section 22 discriminates the watch signal. Based on the signal from the discriminating circuit 221, the control circuit 222 commands closing of the relay RR for about 15 seconds to the receiving control circuit 223. The receiving section 24 is fully powered during the closing of the contact rr of the relay RR, namely for about 15 seconds, and is placed in the receiving condition.

After the watch signal is transmitted from the security controller 6, the second control section 61 transmits the "set" signal as the guard mode signal to the transmitting section 51 of the repeater 5. The set signal includes the user's code, the transmitter-receiver's code, and the set code.

The transmitting section 51 transmits the coded set signal to the transmitter-receiver 2 via the antenna 4. The set signal is transmitted for about 100 msec. Since the receiving section 24 of the transmitter-receiver 2 is already energized, it can receive the set signal. The discriminating circuit 221 of the first control section 22 discriminates the kind of the data (what kind of guard mode) and the inherent code designated to this transmitter-receiver 2. When the discriminating circuit 221 discriminates the set signal as the inherent code applied to this transmitter-receiver, the control circuit 222 applies the set signal to the voltage watching first control circuit 226.

The voltage watching first control circuit 226 transmits a high level signal to the one input of the nand gate 227 until the next command is received. In case of "release the watch" mode or "confirm the present condition" mode, the voltage watching first control circuit 226 transmits a low level signal to the one input of the nand gate 227. To the other input of the nand gate 227 is applied a pulsating high level signal (about 10 msec pulse width) having a shorter pulse period than the term of the watch signal from the pulse oscillator OSC. Thus, both inputs of the nand gate 227 become the high level, the output becomes the low level, and the relay $RS_2$ connected to the output of the nand gate 227 can operate.

When the contact point $rs_2$ of the relay $RS_2$ is closed, the detecting section 21 is energized and the voltage watching first circuit 214 detects the condition of the sensor contact point $E_1$. The relay $RS_1$ operates corresponding to the pulse transmitted from the pulse oscillator OSC, based on the signal transmitted from the detecting control circuit 225 and the voltage watching second control circuit 228. When the contact point $rs_1$ of the relay $RS_1$ is closed, since all the circuits of the detecting section 21 are energized, the voltage watching second circuit 215 can detect the condition of the sensor contact $E_2$ as a 24-hours watch such as fire detection, gas leak detection. Also, the detecting circuit 240, including the removal detect circuit 211, cover detect circuit 212, and voltage down watching circuit 213, can detect the condition of the removal detector A, the destruction detector B, the cover detector C, and the voltage detector D.

The detected signals from detectors A, B, C, D, $E_1$, and $E_2$ are converted to digital signals by the voltage watching circuit 230 and the detecting circuit 240 and transmitted to the first control section 22. The control circuit 222 of the first control section 22 discriminates either emergency data or ordinary data on the basis of these digital signals. The memory section 250 stores the ordinary data or emergency data, such as "fire", "intruder", "gas leak", "panic", "breakdown", "voltage down", "removal", and "destruction". Moreover, the control circuit 222 transmits the above data and the inherent code to the transmitting section 23 and the transmitting control circuit 224, and the contact rt of the relay RT is closed by the signal transmitted from the transmitting control circuit 224 for several hundred msec.

When the contact rt of the relay RT is closed, the control circuit 222 transmits the data of the present condition of the transmitter-receiver 2 including the inherent code of the transmitter-receiver and user's code to the transmitting section 23. The transmitting section 23 transmits the data of the transmitter-receiver 2 to the repeater 5 via the antenna 3. The receiving section 52 of the repeater 5 receives the data transmitted from the transmitter-receiver 2, and the data are stored in the buffer section 53. The second control section 61 of the security controller 6 reads out the data stored in the buffer section 53 using the method of polling at intervals of 1 sec. The security controller 6 watches whether all transmitter-receivers provided in the predetermined guard area transmitted or not the data of the present condition, after the watch signal transmitted from the security controller 6 for within about 10 sec.

If any transmitter-receiver does not transmit the signal, the security controller 6 again operates the above operation and finds the location of the problem transmitter-receiver based on its inherent code. The display section 62 displays the location of the problem transmitter-receiver on the display device and indicates the "trouble" by marks or characters and sounds. This emergency data is transmitted from the transmitting section 64 to the central station 7 via a transmission line 8. The second control section 61 again transmits the confirmation signal including the user's code, the transmitter-receiver code, and receipt signal to the transmitter-receiver 2 via the repeater 5. The first control section 22 discriminates the confirmation signal for about 100 msec and clears the data stored in the memory 250.

Figure 5A:
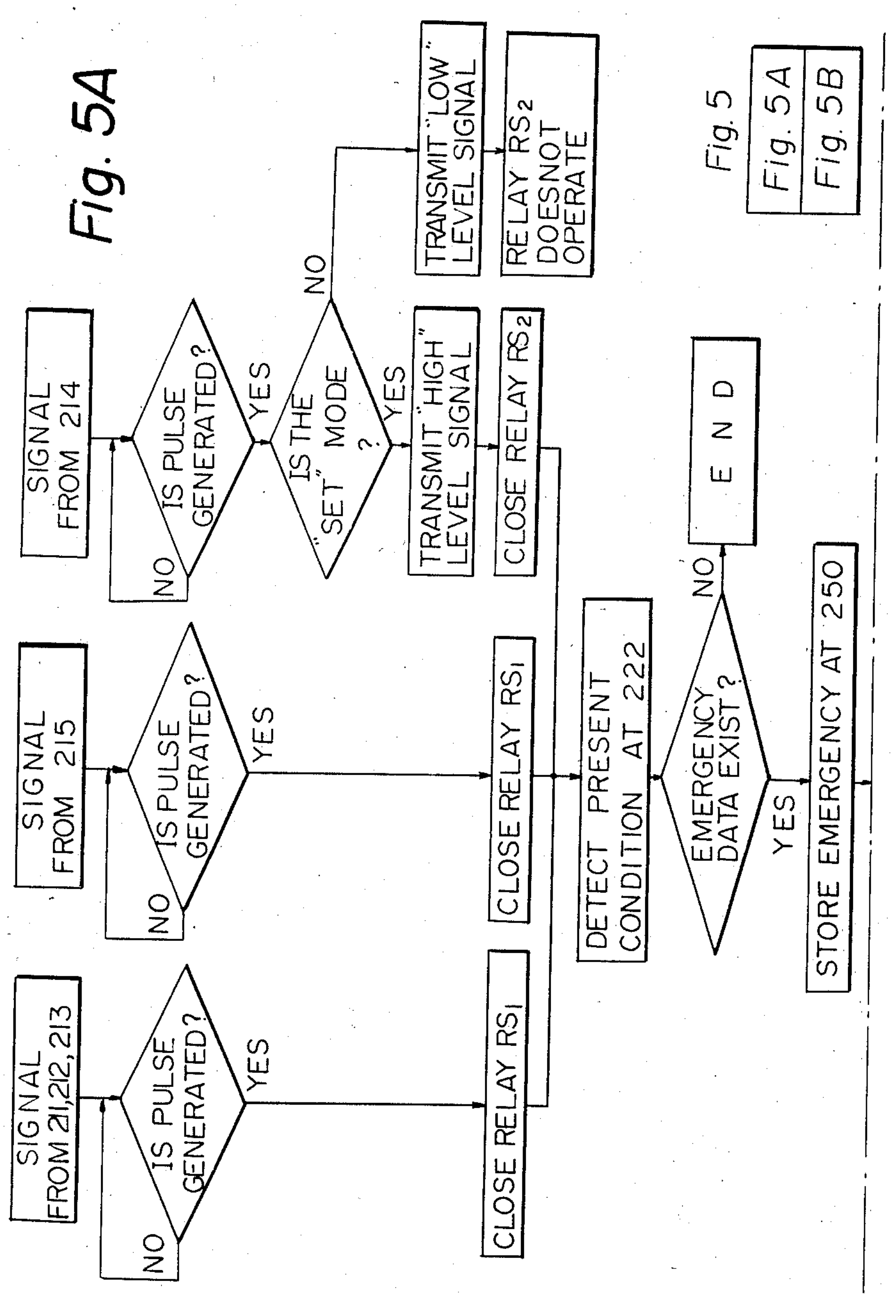
FIGS. 5A, 5B are a flowchart of the detect emergency routine in the operation of the security alarm system of FIG. 1.
Figure 5B:
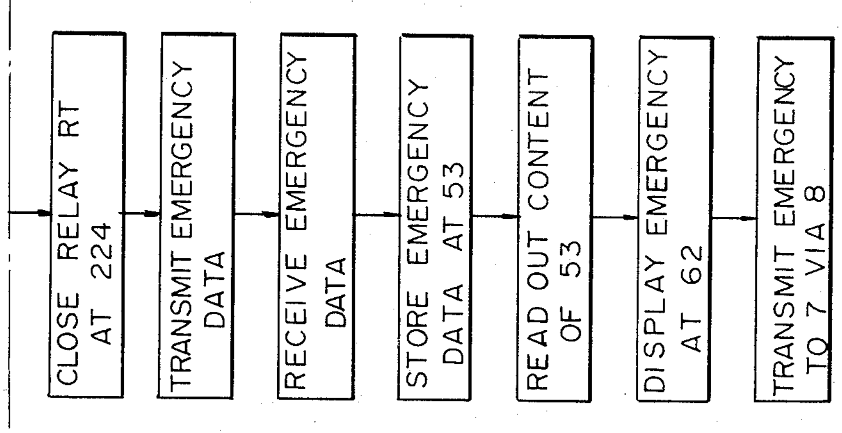

FIG. 5 is a flowchart of the detect emergency in the operation of the security alarm system according to the present invention.

As an example, suppose that the transmitter-receiver is removed by an intruder. The contact point of the removal detector A of the detecting section 21 is normally closed. When the transmitter-receiver 2 is removed by an intruder, however, the contact point is opened. If the contact point $rs_1$ of the relay $RS_1$ is closed in response to the pulse oscillator OSC, since the contact point of the removal detector A is opened, a "0" signal is transmitted from the output of the removal detect circuit 211 to the control circuit 222 of the first control section 22. When the control circuit 222 receives the "0" signal, it transmits it to the transmitting control circuit 224, and the relay RT is closed for a predetermined term, for example, several hundred msec at the same time, the control circuit 222 transmits the transmitter-receiver's code, the user's code, and the emergency data to the transmitting section 23, and the transmitting section 23 transmits the data to the repeater 5 via the antenna 3. The data received at the receiving section 52 of the repeater 5 is simultaneously decoded by the receiving section 52 and stored by the buffer section 53. The second control section 61 of the security controller 6 always reads out the data stored in the buffer section 53 using the method of polling at intervals of 1 sec and always watches the transmitter-receiver's code and the user's code. After the transmitter-receiver code and the user's code are confirmed as the code assigned to this security alarm system, the emergency data regarding the removal is displayed on the display section 62 using the map and the characters or is announced by voice. At the same time, the emergency data regarding the removal is transmitted to the central station 7 via the transmission line 8. Operations for other emergencies, such as destruction of the transmitter-receiver, etc, are performed in the same way.

Operations of other modes, such as "release the watch" and "confirm the present condition" are performed in the same way mentioned before according to FIG. 4. Although a preferred embodiment of the present invention has been described heretofore, it should be understood that various modifications and alterations of the embodiment are possible.

For example, the repeater 5 and the security controller 6 can be combined into a single unit; a plurality of repeaters can be used for a large guard area; the transmission of the signal can be performed through ultrasonic waves or infrared rays between the transmitter-receiver and the repeater; and the security controller 6 can be performed without the transmission line 8 to the central station, depending on user's choice.

We claim:

1. A security alarm system for watching emergency situations in a predetermined guard area comprising:

a plurality of sensors for detecting the emergencies;

a transmitter-receiver for a guard area connected to said sensors and having a battery power source;

a repeater associated with said transmitter-receiver through radio;

a security controller connected to said repeater; and a central station connected to said security controller using a transmission line and giving a guard command to an operator on the basis of emergency or ordinary data transmitted from said security controller;

means for providing a pulsating voltage from said power source for the guard area such that a predetermined pulsating voltage is applied from said battery power source to said transmitter-receiver under ordingary conditions, a predetermined voltage having a longer term than a period of said pulsating voltage is applied to a receiving section of said transmitter-receiver in response to a watch signal transmitted from said security controller via said repeater before transmitting a guard mode signal from said security controller and a predetermined voltage having a longer term than the said pulsating voltage is applied to a transmitting section of said transmitter-receiver in response to an emergency signal transmitted from said sensors at emergencies, or in response to said guard mode signal transmitted from said security controller via said repeater;

said repeater stores the emergency and ordinary data transmitted from said transmitter-receiver temporarily; and said security controller reads out these data stored in said repeater, discriminates emergency or ordinary data, and transmits emergency data and guard mode signal to said central station.

2. A security alarm system as claimed in claim 1 characterized in that the transmission of the signal is performed alternatively between said transmitter-receiver and said repeater.

3. A security alarm system as claimed in claim 1, characterized in that the transmission of the signal is performed through electromagnetic wave between said transmitter-receiver and said repeater.

4. A security alarm system as claimed in claim 1, characterized in that the transmission of the signal is performed through ultrasonic waves between said transmitter-receiver and said repeater.

5. A security alarm system as claimed in claim 1, characterized in that the transmission of the signal is performed through infrared rays between said transmitter-receiver and said repeater.

* * * * *